Patented July 5, 1927.

1,634,459

UNITED STATES PATENT OFFICE.

OSCAR GERLACH, OF LA SALLE, ILLINOIS.

PROCESS OF MANUFACTURE OF PLASTER MATERIAL.

No Drawing.   Application filed March 13, 1925. Serial No. 15,365.

My invention relates to the treatment of basic calcium compounds, as for example, quick lime, slaked lime, or limestone, with sulphuric acid, to form a plaster material containing plaster of Paris. Plaster of Paris is ordinarily made by calcining at 100–125° C. the natural sulphate of calcium, gypsum. Gypsum, which is $CaSO_4.2H_2O$, on heating at this temperature loses part of its water of crystallization to form $(CaSO_4).2H_2O$, known to commerce as plaster of Paris. It is also well known that certain calcium compounds when treated in water suspension or solution with sulphuric acid yield calcium sulphate, $CaSO_4.2H_2O$, which may, on heating at the correct temperature, be converted into plaster of Paris.

At certain periods sulphuric acid is produced as a by-product in large excess over the market demand for it. The purpose of this process is to afford a profitable outlet for such acid. The ordinary method, as above, of using sulphuric acid to form calcium sulphate and calcining to form plaster of Paris would be so expensive as to reduce the profits of such a manufacture nearly or quite to nothing.

This invention has for one of its objects an economical process for producing plaster material, containing plaster of Paris, that will be suitable as a commercial plaster.

A further object is to provide a profitable outlet for surplus quantities of by-product sulphuric acid when the market for this acid is slack, by using this acid in a cheap process for making plaster material.

A further object is to make possible the economic utilization of waste lime sludges.

A further object is to utilize the heat of reaction of lime, or other basic calcium compound and sulphuric acid in the economic production of a plaster material.

Other and further important objects of the invention will be apparent from the disclosures in the following description, which sets forth the preferred form of my invention.

My process is to treat a basic calcium compound, such as calcium oxide or carbonate, with sulphuric acid of such strength that the heat generated in the reaction is sufficient to volatilize both the excess water present in the acid and the excess water formed by the reaction over that necessary to form $2CaSO_4.H_2O$ directly. The reaction would be in the case of lime: $2CaO$ plus $2H_2SO_4$___ $2CaSO_4.H_2O$ plus $H_2O$. The plaster of Paris is thus formed directly, without the additional step of calcination by addition of heat from an outside source.

In the preferred form of my invention, limestone is crushed until most of it passes through a ½″ screen, after which the crushed stone together with the fines is heated in a kiln at not less than 1600° F. or 870° C. for a period of three (3) hours. At the end of this time only part of the $CO_2$ gas has been expelled, so that the burned rock contains a considerable amount of calcium carbonate as well as calcium oxide. The rock while still hot is fed into any suitable open mixer and an amount of 60° Baumé sulphuric acid equal to about one-fifth the weight of the burned rock is added and mixed with the rock. The heat in the rock and the heat generated by the reaction is sufficient to evaporate all of the water in the sulphuric acid and all of the water formed in the reaction in excess of that required to form calcium sulphate hemi-hydrate. It is obvious that the strength of the sulphuric acid may be varied to compensate for variations in the amount of heat contained by the burnt rock, and also that it may be varied to vary the resulting temperature of the reacting mass. Since plaster of Paris is formed most readily at a temperature around 125° the strength of the sulphuric acid should be such that this temperature will be obtained.

When the reaction is complete, the dry mass, containing a mixture of about 70% calcium carbonate and calcium oxide and 30% calcium sulphate hemi-hydrate, is fed directly into a tube mill, or other fine grinding mill. The coarse particles of limestone and lime will be thoroughly ground up and mixed intimately with the calcium sulphate hemi-hydrate. After grinding to the proper fineness, the material is suitable for use as a commercial plaster.

It is thus seen that an economical process has been provided in which no application of external heat is required to form a plaster material containing plaster of Paris.

This procedure would also apply to hydrated lime, or lime sludges rich in lime or calcium carbonate. In the case of a magnesium limestone, such as dolomite or the oxide therefrom, I would use only sufficient sulphuric acid to react with the calcium present, thus leaving the greater part of the magnesium compound present in the plaster as such. In this way the objectionable characteristics of magnesium sulphate in the plaster would be avoided.

I am aware that numerous details of the process may be varied through a wide range without departing from the spirit of this invention, and I do not desire limiting the patent granted otherwise than as necessitated by the prior art.

I claim as my invention:

1. The process of making a plaster, which includes treating hot, freshly burnt crushed limestone with about one-fifth of its weight of 60° Baumé sulphuric acid, mixing thoroughly and crushing the reaction mass to the desired fineness.

2. The process of making a plaster material, which includes the partial burning of crushed limestone at not less than 1600° F. for about 3 hours, the treatment of the rock so burnt with about one-fifth its weight of 60° Baumé sulphuric acid, and the crushing of the product so formed to the desired fineness for use as a plaster.

3. The process of making a plaster material containing about 70% calcium carbonate and calcium oxide and 30% calcium sulphate hemi-hydrate, which comprises treating hot, freshly burnt crushed limestone with sulphuric acid of such concentration and in such quantity that a part of the burnt limestone is converted directly by the heat of the reaction into calcium sulphate hemi-hydrate without the addition of external heat.

In testimony whereof I have hereunto subscribed my name.

OSCAR GERLACH.